Patented Apr. 15, 1924.

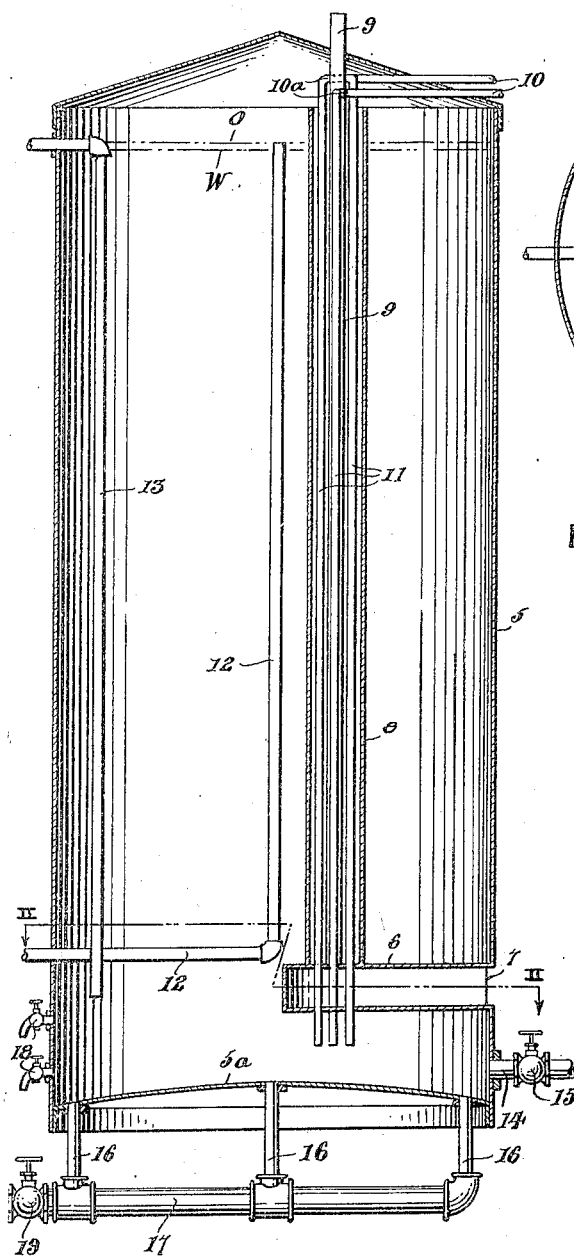

1,490,576

UNITED STATES PATENT OFFICE.

GUY O. ALLEN, OF TULSA, OKLAHOMA.

OIL SAVER.

Application filed June 28, 1923. Serial No. 648,261.

*To all whom it may concern:*

Be it known that I, GUY O. ALLEN, a citizen of the United States of America, residing at Tulsa, in the county of Tulsa and State of Oklahoma, have invented certain new and useful Improvements in Oil Savers, of which the following is a specification.

This invention relates to improved apparatus for saving petroleum oil which, for instance, has become mixed with water, dirt, or other foreign substances during its handling in oil fields and has, therefore, become unmarketable.

An important object of this invention is to provide an apparatus which will subject petroleum oil, or the like, to a suitable treatment to remove undesirable foreign substances therefrom.

A further object of the invention is to provide an apparatus of the above mentioned type which is of simple construction and one that may be operated at a very nominal expense for accomplishing the aforesaid result.

Other objects and advantages of the invention will be apparent during the course of the following description.

In the accompanying drawing forming a part of this specification and in which like numerals are employed to designate like parts throughout the same, Figure 1 is a substantially central vertical sectional view, partly in elevation, of the apparatus embodying this invention, Figure 2 is a transverse sectional view taken on line II—II of Fig. 1, Figure 3 is a horizontal sectional view of a fragmentary portion of the apparatus and shows in detail the relative positions of the unmarketable petroleum feeding pipes and a vent pipe leading from the aforesaid heater, Figure 4 is a detail elevational view of a fragmentary portion of the unmarketable petroleum feeding pipes showing their relative positions in respect to the heater vent pipe, and Figure 5 is a fragmentary top plan view of the arrangement of pipes shown in Fig. 4.

In the drawing, wherein for the purpose of illustration is shown a preferred embodiment of this invention, the numeral 5 designates a tank which is suitably closed at both ends and formed from any desirable material. It is to be understood that this tank may be formed of a suitable size to possess the capacity desired by the owner.

Referring particularly to Figs. 1 to 3 inclusive, there is shown a heater casing or oven 6 which is positioned transversely within the said tank and formed at its outer open end integrally with the walls of the latter. The open end 7 of this heater casing or oven is provided for permitting the insertion of a heater element within the said casing. Formed integrally with the upper wall of the heater casing 6 is a perpendicularly extending casing 8 which is closed at its lower end by the said wall of the heater casing 6 while the upper end is open for communicating with the extreme upper end of the tank 5. Communicating with the heater casing or oven 6 is a vent pipe 9 which extends longitudinally within the perpendicular casing 8 and terminates exteriorly at its upper end above the tank 5 and is provided for conveying fumes and heat from the heater casing 6 upwardly through the perpendicular casing 8.

Extending transversely through the top wall of the tank 5 are a pair of pipes 10 which are each suitably connected to a pair of vertical pipes 11 which extend longitudinally downwardly through the perpendicular casing 8 and terminate below the lower wall of the heater casing or oven 6 in proximity to the bottom wall 5ª of the tank 5. By closely inspecting Figs. 4 and 5, it will be seen that the pipes 10 are each provided at their inner ends with tubular yoke formations 10ª which are connected at the outer ends of the side portions of the yoke with the diametrically arranged upper ends of the vertical pipes 11. The vent pipe 9 which extends vertically from the heater casing or oven 6 is axially arranged in respect to the vertical pipes 11 and is adapted for suitably heating the unmarketable petroleum being conveyed through the said pipes 11.

Extending through the side wall of the tank to a point substantially centrally of the latter and then upwardly to what I have termed the oil level O is a pipe 12 that is adapted for drawing off the good petroleum oil after the foreign substances have been removed therefrom. Projecting into the tank 5 through one wall of the same at a point slightly below the oil level O is a second pipe 13 that extends downwardly to a point substantially on a plane with the heater casing or oven 6. It is to be understood that the pipes 12 and 13 are open at their free ends for communicating with the interior of the tank 5. Communicating with this tank 5 at substantially its lower end is a pipe 14 having a valve 15 located therein through which fresh water is admitted to the interior of the said tank 5. This tank is further provided with a series of branch pipes 16 that communicate with the said tank through the bottom wall 5$^a$ and are all connected to a main pipe 17 for the purpose of drawing off the residue collected at the bottom of the tank. There are further provided a pair of suitably spaced petcocks 18 that communicate with the interior of the tank 5 through one wall of the same and are located at the lower part thereof for the purpose of testing the condition of the oil and water positioned within the tank 5 at the levels of the said petcocks.

The operation of the device is as follows:—

The tank 5 is first filled with water through the pipe 14 up to the level indicated by the character W. The burner or other heating element positioned within the heater casing or oven 6 is then lighted for the purpose of partially heating the water within the tank. When the water has become sufficiently heated, the unmarketable petroleum is fed through the pipes 10 into the vertical pipes 11 where it will pass downwardly through the casing 8 and in proximity to the vent pipe 9. During this downward travel of the unmarketable petroleum it will become heated and will be discharged at the point below the casing 6 into the coolest portion of the water. The lighter portion of the unmarketable petroleum will naturally pass upwardly through the water and will thereby be separated from all foreign substance which will remain at the bottom of the tank. The renovated or cleaned oil, upon arriving at the oil level O, will be drawn off through the depending oil outlet pipe 12 from which it will be conveyed to a suitable storage tank. All surplus water that has been fed into the tank 5 will be drawn off through the pipe 13 and will therefore prevent the conveying of water from the tank through the oil outlet pipe 12. When it is desired to drain off the residue from the bottom of the tank 5, the valve 19 located in the discharge pipe 17 will be opened and the said residue will leave the tank through the branch pipes 16 and thence through the pipe 17.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:—

1. An apparatus for the purpose described, comprising a tank, a heater casing projecting into said tank, a vent pipe for said heater casing passing upwardly through said tank to discharge outwardly of the same, inlet pipes associated in proximity to the vent pipe for discharging unpurified petroleum into said tank, means for discharging water into said tank, means for retaining said water at a desired level, and means for withdrawing the purified petroleum that has accumulated upon the surface of said water.

2. An apparatus for the purpose described, comprising a tank, a water supply for said tank, means for maintaining said water at a desired level, a heating oven projecting into said tank, a vent pipe for said oven, a plurality of unpurified petroleum feeding pipes discharging into said tank below said oven arranged around the vent pipe and extending longitudinally thereof, and means for withdrawing the purified petroleum that has accumulated upon the surface of said water.

3. An apparatus for the purpose described, comprising a tank, means for maintaining a constant level of water in said tank, a heating oven projecting into the tank, a vent pipe for said oven, a casing surrounding said vent pipe in spaced relation thereto, a plurality of unpurified petroleum feeding pipes discharging into said tank below said oven arranged within said casing and extending longitudinally thereof, and means for withdrawing the purified petroleum from the said tank.

4. An apparatus for the purpose described, comprising a tank, means for maintaining a constant level of water in said tank, a heating oven projecting into said tank, a perpendicular casing carried by said oven, a plurality of unpurified petroleum feeding pipes discharging into said tank below said oven extending longitudinally within said casing, means within said casing communicating with said oven for heating the petroleum in said pipes, and means for withdrawing the purified petroleum from said tank.

In testimony whereof I affix my signature.

GUY O. ALLEN.